(12) United States Patent
Conlon

(10) Patent No.: US 7,491,144 B2
(45) Date of Patent: Feb. 17, 2009

(54) SINGLE MODE, COMPOUND-SPLIT TRANSMISSION WITH DUAL MECHANICAL PATHS AND FIXED REDUCTION RATIO

(75) Inventor: Brendan M. Conlon, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 327 days.

(21) Appl. No.: 11/432,096

(22) Filed: May 11, 2006

(65) Prior Publication Data
US 2007/0265128 A1   Nov. 15, 2007

(51) Int. Cl.
*F16H 3/72* (2006.01)
(52) U.S. Cl. .................................................. 475/5
(58) Field of Classification Search ............. 475/5; 180/65.7; 903/914
See application file for complete search history.

(56) References Cited

U.S. PATENT DOCUMENTS

| | | | | |
|---|---|---|---|---|
| 5,931,757 A | 8/1999 | Schmidt | ...................... | 475/2 |
| 6,527,658 B2 | 3/2003 | Holmes et al. | ................. | 475/5 |
| 7,179,185 B2 * | 2/2007 | Raghavan et al. | .............. | 475/5 |
| 7,179,186 B2 * | 2/2007 | Bucknor et al. | ................ | 475/5 |
| 7,179,187 B2 * | 2/2007 | Raghavan et al. | .............. | 475/5 |
| 7,282,004 B2 * | 10/2007 | Raghavan et al. | .............. | 475/5 |
| 2007/0197335 A1 * | 8/2007 | Raghavan et al. | .............. | 475/5 |
| 2007/0275806 A1 * | 11/2007 | Raghavan et al. | .............. | 475/5 |

OTHER PUBLICATIONS

Renault, Society of Automotive Engineers Technical Paper Submission 04CVT-19, Dual Mode Infinitely Variable Transmission, 2004.

* cited by examiner

*Primary Examiner*—Dirk Wright

(57) ABSTRACT

A single mode, compound-split transmission is provided having two mechanical power paths. One mechanical path is primarily active at low speed ratios with the other path being primarily active in high speed ratios. A reduction ratio is available in the path employed for high speed ratios, reducing electrical path power requirements. Additionally, the reduction ratio, allows both of two motor/generators to be of a relatively low torque design.

17 Claims, 4 Drawing Sheets

SINGLE MODE, COMPOUND-SPLIT TRANSMISSION WITH DUAL MECHANICAL PATHS AND FIXED REDUCTION RATIO

TECHNICAL FIELD

The invention relates to a compound-split transmission with dual mechanical paths, one of the paths providing a reduction ratio.

BACKGROUND OF THE INVENTION

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. Typically, an internal combustion engine is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power output.

A vehicle transmission typically delivers mechanical power from an engine to the remainder of a drive system, such as fixed final drive gearing, axles and wheels. A typical mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction known as underdrive, at a direct drive ratio, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between engine and the remainder of the drive system, within the limits of the electric machinery. An electric storage battery used as a source of power for propulsion may be added to this arrangement, forming a series hybrid electric drive system.

The series hybrid system allows the engine to operate with some independence from the torque, speed and power required to propel a vehicle, so the engine may be controlled for improved emissions and efficiency. This system allows the electric machine attached to the engine to act as a motor to start the engine. This system also allows the electric machine attached to the remainder of the drive train to act as a generator, recovering energy from slowing the vehicle into the battery by regenerative braking. A series electric drive suffers from the weight and cost of sufficient electric machinery to transform all of the engine power from mechanical to electrical in the generator and from electrical to mechanical in the drive motor, and from the useful energy lost in these conversions.

A power-split transmission can use what is commonly understood to be a "differential gear set" to achieve a continuously variable torque and speed ratio between input and output. An electrically variable transmission can use a differential gear set to send a fraction of its transmitted power through a pair of electric motor/generators. The remainder of its power flows through another, parallel path that is all mechanical and direct, of fixed ratio, or alternatively selectable.

One form of a differential gear set, as is well known to those skilled in this art, may constitute a planetary gear set. Planetary gearing is usually the preferred embodiment employed in differentially geared inventions, with the advantages of compactness and different torque and speed ratios among all members of the planetary gear set. However, other types of differential gear sets such as bevel gears or other gears in an arrangement where the rotational speed of at least one element of a gear set is always a weighted average of speeds of two other elements.

A hybrid electric vehicle transmission system also includes one or more electric energy storage devices. The typical device is a chemical electric storage battery, but capacitive or mechanical devices, such as an electrically driven flywheel, may also be included. Electric energy storage allows the mechanical output power from the transmission system to the vehicle to vary from the mechanical input power from the engine to the transmission system. The battery or other device also allows for engine starting with the transmission system and for regenerative vehicle braking.

A hybrid transmission in a vehicle can simply transmit mechanical power from an engine input to a final drive output. To do so, the electric power produced by one motor/generator balances the electrical losses and the electric power consumed by the other motor/generator. By using the above-referenced electrical storage battery, the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

A successful substitute for the series hybrid transmission is the two-range, input-split and compound-split electrically variable transmission now produced for transit buses, as disclosed in U.S. Pat. No. 5,931,757, issued Aug. 3, 1999, to Michael Roland Schmidt, commonly assigned with the present application, and hereby incorporated by reference in its entirety. Such a transmission utilizes an input means to receive power from the vehicle engine and a power output means to deliver power to drive the vehicle. First and second motor/generators are connected to an energy storage device, such as a battery, so that the energy storage device can accept power from, and supply power to, the first and second motor/generators. A control unit regulates power flow among the energy storage device and the motor/generators as well as between the first and second motor/generators. "Input-split" means that engine power is delivered to an input member of the transmission and then split through a differential gear set, typically to an electrical power path (a path having an active motor/generator) and a mechanical power path (a path not having an active motor/generator). Compound-split means that, in addition to the differential gear set that accomplishes the input-split, power flows to the output member through another differential gear set, so that power flow through the transmission on the separate electrical and mechanical paths flows through this output differential gear set to be combined at the output member.

Operation in first or second variable-speed-ratio modes of operation may be selectively achieved by using clutches in the nature of first and second torque transfer devices. In the first mode, an input-split speed ratio range is formed by the application of the first clutch, and the output speed of the transmission is proportional to the speed of one motor/generator. In the second mode, a compound-split speed ratio range is formed by the application of the second clutch, and the output speed of the transmission is not proportional to the speeds of either of the motor/generators, but is an algebraic linear combination of the speeds of the two motor/generators. Operation at a fixed transmission speed ratio may be selectively achieved by the application of both of the clutches. Operation of the transmission in a neutral mode may be selectively achieved by releasing both clutches, decoupling the engine and both electric motor/generators from the transmission output. The transmission incorporates at least one mechanical point in its first mode of operation and at least two mechanical points in its second mode of operation.

U.S. Pat. No. 6,527,658, issued Mar. 4, 2003 to Holmes et al, commonly assigned with the present application, and hereby incorporated by reference in its entirety, discloses an electrically variable transmission utilizing two planetary gear sets, two motor/generators and two clutches to provide input-split, compound-split, neutral and reverse modes of operation. Both planetary gear sets may be simple, or one may be individually compounded. A control unit regulates power flow among an energy storage device and the two motor/generators. This transmission provides two ranges or modes of electrically variable transmission (EVT) operation, selectively providing an input-split speed ratio range and a compound-split speed ratio range. One fixed speed ratio can also be selectively achieved.

Hybrid systems may improve vehicle fuel economy in a variety of ways. For instance, the engine may be turned off at idle, during periods of deceleration and braking, and during periods of low speed or light load operation to eliminate efficiency losses due to engine drag. Captured braking energy (via regenerative braking) or energy stored by one of the motors acting as a generator during periods when the engine is operating is utilized during these engine off periods. Transient demand for engine torque or power is supplemented by the motor/generators during operation in engine-on, electrically variable modes, allowing for downsizing the engine without reducing apparent vehicle performance. Additionally, the engine may be operated at or near the optimal efficiency point for a given power demand. The motor/generators are able to capture vehicle kinetic energy during braking, which is used to keep the engine off longer, supplement engine torque or power and/or operate at a lower engine speed, or supplement accessory power supplies. Additionally, the motor/generators are very efficient in accessory power generation and electric power from the battery serves as an available torque reserve allowing operation at a relatively low transmission numerical speed ratio.

A single mode, input-split system requires a high portion of the engine power to flow through the electrical path during acceleration, thus increasing motor power requirements and potentially requiring a DC-DC converter between a storage battery and the motor/generators in order to provide enough voltage. Additionally, the output motor in an input-split design must also have a high torque rating; typically, one to two times the engine torque, depending on the gear ratio available.

A two mode, compound-split system generally achieves a wide ratio of coverage, but requires clutches and mode transitions, with associated spin losses and accessory power requirements.

SUMMARY OF THE INVENTION

A single mode, compound-split transmission is provided having two mechanical power paths. One mechanical path is primarily active at low speed ratios with the other path being primarily active in high speed ratios. A reduction ratio is available in the path employed for high speed ratios, reducing electrical path power requirements. Additionally, the availability of the reduction ratio allows both of two motor/generators to be of a relatively low torque design.

Specifically, an electromechanical transmission within the scope of the invention has an input member, an output member, first and second electric motor/generators, first and second differential gear sets and a reduction gear. The differential gear sets, which may be planetary gear sets, each have a first, a second and a third member and are representable by first, second and third nodes of first and second levers of a lever diagram. The reduction gear is operatively (mechanically) connected with the output member and is configured to provide a reduction in speed ratio. The first node of the first lever is operatively connected with the input member and is continuously connected with the first node of the second lever for common rotation. The second node of the first lever operatively connects with the output member independently of, i.e., without connection through, either the second lever or the reduction gear (i.e., without the reduction ratio provided by the reduction gear having affect on the speed of the output member). The third node of the first lever is continuously connected with the first motor/generator and the third node of the second lever is continuously connected with the second motor generator. Thus, a compound-split electrically variable transmission is provided having two mechanical power paths: the first path is established by the first and second nodes of the first lever independently of the second lever or the reduction gear, and the second path is established by the first node of the first lever, the first and second nodes of the second lever and the reduction gear. The reduction gear, with the reduction ratio it provides, has effect only in the second path.

The reduction gear may be provided as a first member or first node of a third differential gear set that also has second and third members to form a third lever with three nodes. In that instance, the output member and the second node of the third lever are continuously connected with the second node of the third lever and the third node of the third lever is grounded to a stationary member.

Alternatively, the reduction gear may be rotatable with a transfer shaft axially-spaced from the axis of rotation of the input member and the first and second motor generators. In this embodiment, a second transfer gear is also connected for common rotation with the transfer shaft and intermeshes with the second member of the second differential gear set.

The second motor/generator is used to provide an electric launch mode (when acting as a motor) as well as a regenerative braking mode (when acting as a generator). The second motor/generator may also drive a reverse mode when acting as a motor.

In one aspect of the invention, a brake is provided that is selectively engagable to ground the input member to the stationary member. In such an embodiment, the brake provides reaction torque, and the first motor/generator is thus available to act as a motor to assist the second motor/generator in either the electric launch or the reverse mode or to act as a generator to assist the second motor/generator in regenerative braking.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
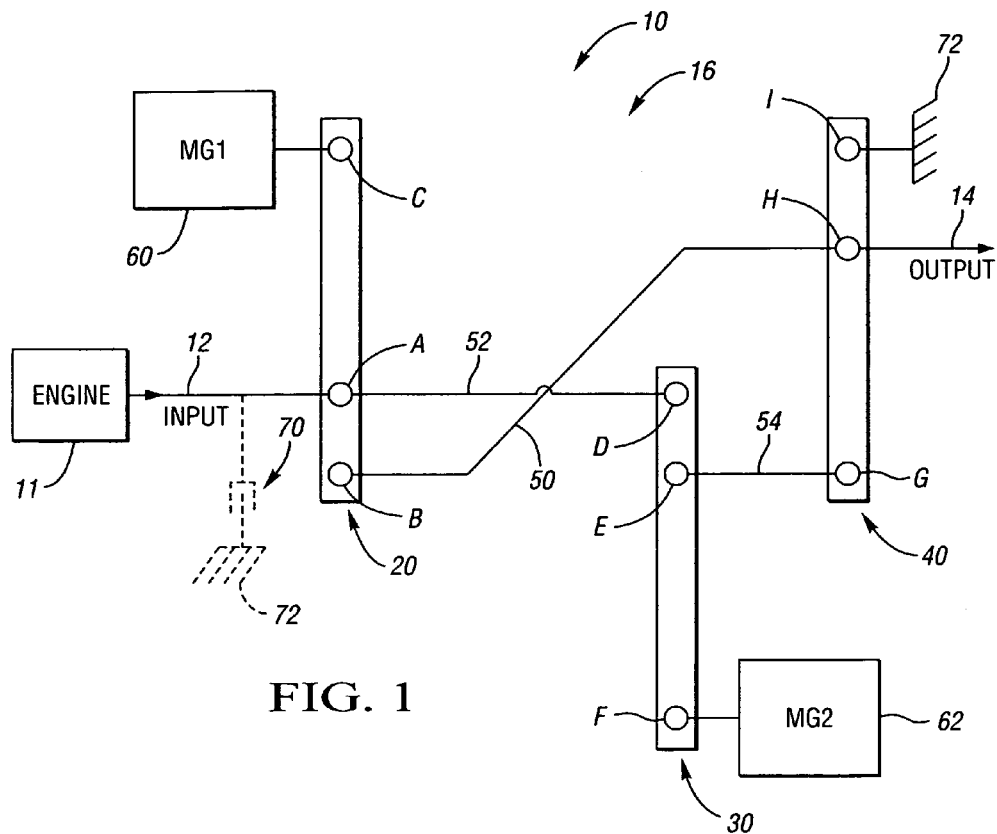
FIG. 1 is a schematic illustration of an electromechanical transmission within the scope of the invention, depicted in lever diagram form.

Referring to the drawings, wherein like reference numbers refer to like components, FIG. 1 shows one embodiment of an electrically variable transmission (EVT) designated generally by the numeral 10 having an engine 11 connected thereto. The transmission 10 is designed to receive at least a portion of its driving power from the engine 11. The engine 11 has an output shaft that serves as an input member 12 of the transmission 10. An output member 14 of the transmission 10 connects to a final drive unit (not shown) to deliver driving power to the wheels of a vehicle. The transmission 10 is represented by a lever diagram 16 in FIG. 1, as will be readily understood by those skilled in the art. A first lever 20 representing a first differential gear set includes a first, a second and a third node A, B, C, respectively. The first differential gear set is preferably a planetary gear set. The nodes A, B and C represent a first, a second and a third member of the first planetary gear set, preferably a carrier member, a ring gear member and a sun gear member, although not necessarily in that order.

The transmission 10 also includes a second lever 30 representing a second differential gear set, and including a first, a second and a third node, D, E, F, respectively. The second differential gear set is preferably a planetary gear set. The nodes D, E, and F represent a first, a second and a third member of the second planetary gear set, with the first, second and third members being a ring gear member, a carrier member and a sun gear member, although not necessarily in that order.

The transmission 10 further includes a third lever 40 including a first, a second and a third node, G, H, I, respectively. Those skilled in the art will recognize that the third lever 40 may represent a differential gear set, such as a planetary gear set, or intermeshing gears on parallel axes of rotation, as discussed below with respect to FIG. 4. Node G represents the member of lever 40 that acts as a reduction gear, providing a reduction in speed ratio when power flows into the node G and flows out at mode H to the output member 14. The reduction in speed ratio is dependent upon selected tooth counts of the gear members represented by lever 40.

The input member 12 is also continuously connected with node A. An interconnecting member 50 continuously connects node B with node H. An interconnecting member 52 continuously interconnects node A with the node D. An interconnecting member 54 continuously connects node E with node G. The output member 14 is continuously connected to node H. Additional final drive gearing (not shown) may be connected between node H and the output member 14.

Figure 2:
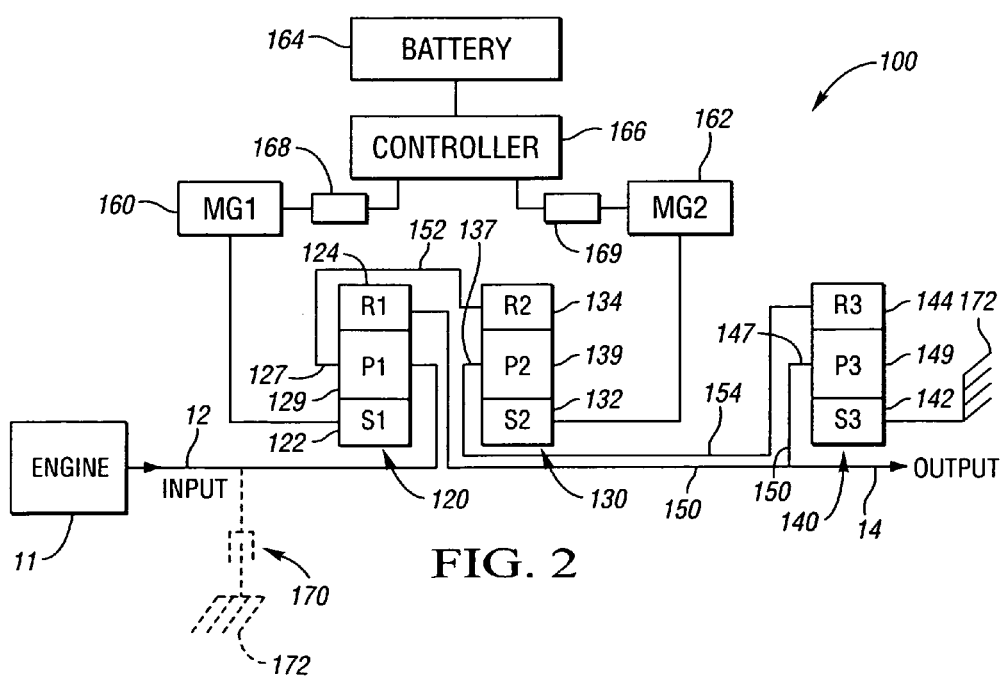
FIG. 2 is a schematic illustration of a first embodiment of the transmission of FIG. 1 in stick diagram form.
Figure 3:
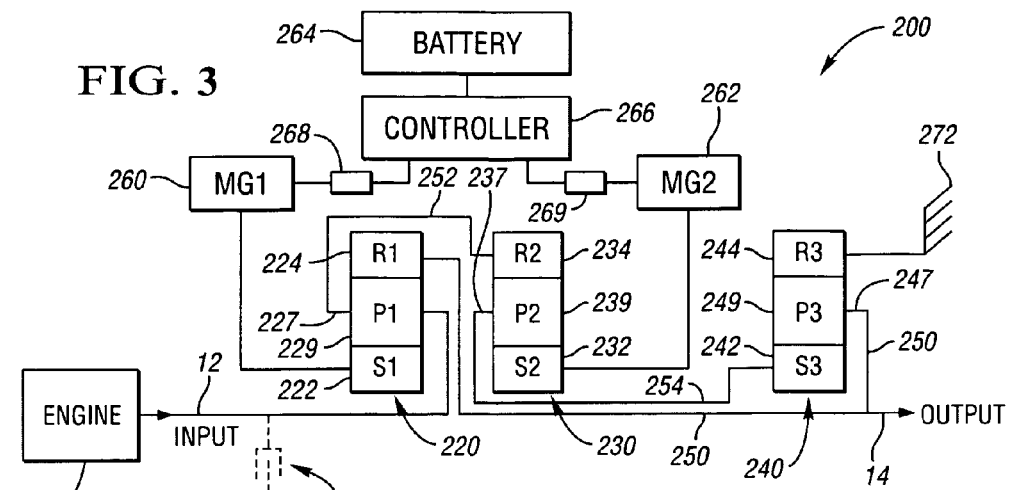
FIG. 3 is a schematic illustration of a second embodiment of the transmission of FIG. 1 in stick diagram form.
Figure 4:
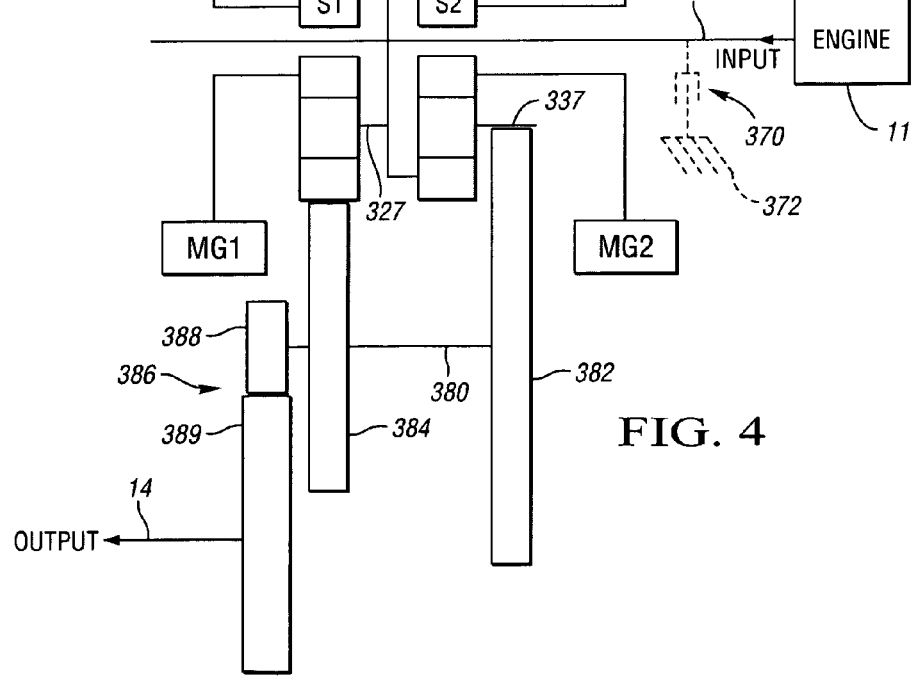
FIG. 4 is a schematic illustration of a third embodiment of the transmission of FIG. 1, in stick diagram form.

A first motor generator 60 (designated MG1) is continuously connected with node C. A second motor/generator 62 (designated MG2) is continuously connected with node F. Connection of the motor/generators 60, 62 to nodes C and F, respectively, establishes the transmission as an EVT, i.e., a hybrid transmission with a motor/generator connected to a member of a differential gear set to establish a continuously variable ratio through the gear set. A battery and a controller, not shown in FIG. 1 but connected to the motor/generators 60, 62 in like manner as the those described with respect to FIGS. 2-4, is employed to selectively supply or receive power via the nodes C and F, respectively.

An optional torque-transmitting mechanism, brake 70 selectively grounds the input member to a stationary member such as the transmission housing 72. Because the brake 70 is optional, it is shown in phantom in FIG. 1. Node I is continuously connected to the transmission housing 72.

A first mechanical power path includes node A, node B, interconnecting member 50 and node H. A second mechanical power path includes node A, node D, node E, node G, and node H.

Operational Description

Launch. Forward Mode

The system is capable of launching the vehicle either with engine 11 off or running. If the engine 11 is off, MG2 62 is used to launch the vehicle through a reduction gear ratio provided by the second planetary gear set represented by lever 30 and a reduction ratio provided through lever 40 via a reduction gear (represented by node G). The engine 11 remains at zero speed and MG1 60 spins in the reverse direction, providing reaction torque to hold the engine 11 at zero speed. If brake 70 is present, it is not necessary for MG1 60 to provide reaction torque, and MG1 60 can act as a motor to assist MG2 62 with driving torque. To start the engine 11, MG1 60 decelerates to zero speed while motor MG2 62 provides reaction torque as well as torque to drive the vehicle. During this process MG2 62 decelerates, providing its inertial energy to the road. This accelerates the engine 11 to a speed where it may be fueled. Once the engine 11 is running, engine power is split through the first planetary gear set, represented by lever 20, and MG1 60, which generates power while MG2 62 motors.

Drive, Forward Mode

Power is transmitted to the output member 14 through both a mechanical and electrical path. The system operates in a compound-split mode. Power flow is in the forward direction (non-circulating) as long as motors MG1 60 and MG2 62 have positive speed. When motor MG1 60 speed is negative, MG2 62 acts as a generator to supply power to motor MG1 60. For low ratio operation, MG2 62 spins at relatively high speed. This provides the advantage that inertial energy stored in the spinning MG2 62 is available to assist battery power during tip-in conditions (i.e., when acceleration is desired).

Extremely good transient response and quick "downshifts" should be attainable with this design. For high ratios, the speed of MG2 62 becomes negative, and power flow is in the reverse (circulating) direction. Alternately, MG2 62 could be held near zero speed and battery power could be supplied through MG1 60.

Regenerative braking is accomplished by balancing engine 11, motor MG1 60, and motor MG2 62 torque to provide the desired deceleration rate. Once the vehicle speed becomes low enough, the engine 11 may be shut off and further deceleration can be accomplished using MG2 62 acting as a generator to serve as the primary braking motor/generator, and MG1 60 motoring to provide reaction torque. If brake 70 is present, the engine on-to-off transition control is simplified, since the brake can be operated in a controlled slip manner to apply a torque directly at the engine shaft to slow it down at the desired rate. Also, MG1 60 no longer needs to provide reaction torque, and can therefore assist in braking.

Drive, Reverse Mode

The system is capable of operation in reverse mode with engine 11 off or with engine 11 running. Reverse operation with engine 11 running involves large circulating power, with MG1 60 generating and also providing reaction torque, and MG2 62 motoring in reverse to propel the vehicle. This will tend to limit the power that can be delivered to the road in reverse mode. With the engine 11 off, using battery power, circulating power is reduced but is still required for MG1 60 to provide reaction torque. Use of brake 70 eliminates the need for circulating power in reverse with engine 11 off and allows MG1 60 to assist in propelling the vehicle.

A key advantage of this design over other EVT designs is that the electrical power flow is forward (non-circulating) over a wide range of ratio. Electrical circulating power (or a power loop) in an EVT refers to a condition where the mechanical path carries more than 100% of the output power. Under normal forward electrical power flow conditions, the engine power is split with some portion transmitted electrically and the remainder transmitted mechanically. When operating at higher speed ratios, the speed of MG2 62 becomes negative, reversing the direction of the electrical power flow so the mechanical path must carry the full output power plus the electrical power. Under this condition, the electrical power is said to be circulating in the system. Therefore, the electrical path torque and power must be sized for greater than 100% of the output torque and power in order to accommodate the circulating power.

First Embodiment

The transmission 10 represented in lever diagram form in FIG. 1 can be realized by a number of design alternative embodiments, including those represented by stick diagrams in FIGS. 2 and 3 which are longitudinal designs. FIG. 2 shows a transmission 100 designed to receive at least a portion of its driving power from the engine 11. The engine 11 has an output shaft that serves as an input member 12 of the transmission 100. An output member 14 of the transmission 100 connects to a final drive unit (not shown) to deliver driving power to the wheels of a vehicle. The transmission 100 includes three simple planetary gear sets. A first planetary gear set 120 includes a sun gear member 122 (designated S1), a ring gear member 124 (designated R1) and a carrier member 127 that rotatably supports a plurality of pinion gears 129 (designated P1) in meshing engagement with both the sun gear member 122 and the ring gear member 124.

The transmission 100 also includes a second planetary gear set 130 that includes a sun gear member 132 (designated S2), a ring gear member 134 (designated R2) and a carrier member 137 that supports a plurality of pinion gears 139 (designated P2) in meshing engagement with both the ring gear member 134 and the sun gear member 132.

The transmission 100 further includes a third planetary gear set 140 that includes a sun gear member 142 (designated S3), a ring gear member 144 (designated R3), and a carrier member 147 rotatably supporting a plurality of pinion gears 149 (designated R3) in meshing engagement with both the ring gear member 144 and the sun gear member 142.

The input member 12 is continuously connected with carrier member 127. An interconnecting member 150 continuously connects ring gear member 124 with carrier member 147 and output member 14. An interconnecting member 152 continuously interconnects carrier member 127 with ring gear member 134. An interconnecting member 154 continuously connects carrier member 137 with ring gear member 144. The output member 14 is continuously connected with the carrier member 147.

A first motor generator 160 (designated MG1) is continuously connected with the sun gear member 122. A second motor/generator 162 (designated MG2) is continuously connected with the sun gear member 132. A battery 164 selectively supplies power to or receives power from MG1 160 and/or MG2 162 under the control of controller 166. Other electric storage devices that have the ability to store electric power and dispense electric power may be used in place of the battery 164 without altering the concepts of the present invention. The battery 164 will be sized depending on regenerative requirements, regional issues such as grade and temperature, and other requirements such as emissions, power assist and electric range.

The controller 166 is in signal communication with the battery 164 and with MG1 160 and MG2 162. Additionally, the controller 166 communicates with other vehicle electrical components (not shown), such as electrical power steering, and electrical power braking systems, etc.

The controller 166 responds to a variety of input signals including vehicle speed, operator demand, the level to which the battery 164 is charged and the power being applied by the engine 11, to regulate the flow of power between the battery 164 and the motor/generators, MG1 160 and MG2 162. The controller 166 can manipulate each of the motor/generators 160 and 162 to act as either a motor or a generator, by applying the appropriate voltage and current via power inverters 168 and 169, respectively. The inverters 168, 169 regulate the flow of power between the battery 164 and the motor/generators MG1 160, MG2 162, to convert between direct current power utilized by the battery 164 and alternating current power utilized by and/or generated by the motor/generators MG1 160, MG2 162. The use of power inverters is readily understood by those skilled in the art.

An optional torque-transmitting mechanism, brake 170, selectively grounds the input member 12 to a stationary member such as the transmission housing 172. Because the brake 170 is optional, it is shown in phantom in FIG. 2. The sun gear member 142 is continuously connected to the transmission housing 172.

The relationship between the stick diagram transmission 100 and the lever diagram of FIG. 1 is as follows: the planetary gear set 120 corresponds with lever 20, the planetary gear set 130 corresponds with lever 30 and planetary gear set 140 corresponds with lever 40. Specifically, carrier member 127 is node A, ring gear member 124 is node B, and sun gear member 122 is node C. Ring gear member 134 is node D, carrier member 137 is node E and sun gear member 132 is node F. Ring gear member 144 is node G (the reduction gear providing a fixed reduction ratio through gear set 140), carrier member 147 is node H and sun gear member 142 is node I. The first mechanical path includes the carrier member 127, the ring gear member 124, interconnecting member 150 and carrier member 147. The second mechanical path includes the carrier member 127, interconnecting member 152, the ring gear member 134, the carrier member 137, interconnecting member 154, the ring gear member 144 and the carrier member 147. The reduction ratio achieved in the second mechanical path (i.e., the ratio of speed input at the ring gear member 144 to the speed output at the carrier member 147) is according to the following formula:

$RR2=1+S/R$, where RR2 is the reduction ratio in the second mechanical path, R is the tooth count of the ring gear member 144 and S is the tooth count of the sun gear member 142.

The transmission 100 performs as described above with respect to the transmission 10 to achieve the launch mode, forward drive mode, reverse drive mode and regenerative braking.

Second Embodiment

The stick diagram of FIG. 3 embodying the lever diagram 16 of FIG. 1 is similar to the stick diagram of FIG. 2, but changes the reduction gear connections to give a higher reduction ratio. FIG. 3 shows a transmission 200 designed to receive at least a portion of its driving power from the engine 11. The engine 11 has an output shaft that serves as an input member 12 of the transmission 200. An output member 14 of the transmission 200 connects to a final drive unit (not shown) to deliver driving power to the wheels of a vehicle. The transmission 200 includes three simple planetary gear sets. A first planetary gear set 220 includes a sun gear member 222 (designated S1), a ring gear member 224 (designated R1) and a carrier member 227 that rotatably supports a plurality of pinion gears 229 (designated P1) in meshing engagement with both the sun gear member 222 and the ring gear member 224.

The transmission 200 also includes a second planetary gear set 230 that includes a sun gear member 232 (designated S2), a ring gear member 234 (designated R2) and a carrier member 237 that supports a plurality of pinion gears 239 (designated P2) in meshing engagement with both the ring gear member 234 and the sun gear member 232.

The transmission 200 further includes a third planetary gear set 240 that includes a sun gear member 242 (designated S3), a ring gear member 244 (designated R3), and a carrier member 247 rotatably supporting a plurality of pinion gears 249 (designated P3) in meshing engagement with both the ring gear member 244 and the sun gear member 242.

The input member 12 is continuously connected with the carrier member 227. An interconnecting member 250 continuously connects ring gear member 224 with carrier member 247 and output member 14. An interconnecting member 252 continuously interconnects carrier member 227 with ring gear member 234. An interconnecting member 254 continuously connects carrier member 237 with sun gear member 242. The output member 14 is continuously connected with the carrier member 247.

A first motor generator 260 (designated MG1) is continuously connected with the sun gear member 222. A second motor/generator 262 (designated MG2) is continuously connected with the sun gear member 232. A battery 264 selectively supplies power to or receives power from MG1 260 and/or MG2 262 under the control of controller 266. Other electric storage devices that have the ability to store electric power and dispense electric power may be used in place of the battery 264 without altering the concepts of the present invention. The battery 264 will be sized depending on regenerative requirements, regional issues such as grade and temperature, and other requirements such as emissions, power assist and electric range.

The controller 266 is in signal communication with the battery 264 and with MG1 260 and MG2 262. Additionally, the controller 266 communicates with other vehicle electrical components (not shown), such as electrical power steering, and electrical power braking systems, etc.

The controller 266 responds to a variety of input signals including vehicle speed, operator demand, the level to which the battery 264 is charged and the power being applied by the engine 11, to regulate the flow of power between the battery 264 and the motor/generators, MG1 260 and MG2 262. The controller 266 can manipulate each of the motor/generators 260 and 262 to act as either a motor or a generator, by applying the appropriate voltage and current via power inverters 268, 269, respectively. The inverters 268, 269 regulate the flow of power between the battery 264 and the motor/generators MG1 260, MG2 262, to convert between direct current power utilized by the battery 264 and alternating current power utilized by and/or generated by the motor/generators MG1 260, MG2 262. The use of power inverters is readily understood by those skilled in the art.

An optional torque-transmitting mechanism, brake 270, selectively grounds the input member 12 to a stationary member such as the transmission housing 272. Because the brake 270 is optional, it is shown in phantom in FIG. 3. The ring gear member 244 is continuously connected to the transmission housing 272.

The relationship between the stick diagram transmission 200 and the lever diagram of FIG. 1 is as follows: the planetary gear set 220 corresponds with lever 20, the planetary gear set 230 corresponds with lever 30 and planetary gear set 240 corresponds with lever 40. Specifically, carrier member 227 is node A, ring gear member 224 is node B and sun gear member 222 is node C. Ring gear member 234 is node D, carrier member 237 is node E and sun gear member 232 is node F. Sun gear member 242 is node G (the reduction gear providing a fixed reduction ratio through gear set 240), carrier member 247 is node H and ring gear member 242 is node I. The first mechanical path includes the carrier member 227, the ring gear member 224, interconnecting member 250 and carrier member 247. The second mechanical path includes the carrier member 227, interconnecting member 252, the ring gear member 234, the carrier member 237, interconnecting member 254, the sun gear member 244, pinion gears 249 and the carrier member 247. The reduction ratio achieved in the second mechanical path (i.e., the ratio of speed input at the sun gear member 242 to the speed output at the carrier member 247) is according to the following formula:

$RR2=1+R/S$, where RR2 is the reduction ratio in the second mechanical path, R is the tooth count of the ring gear member 244 and S is the tooth count of the sun gear member 242.

Because the ratio of ring gear member tooth count to sun gear member tooth count (R/S) is greater than the ratio of sun gear member tooth count to ring gear member tooth count (S/R), the reduction ratio achieved in the second mechanical path is always greater for the transmission 200 of FIG. 3 than for the transmission 100 of FIG. 2. The transmission 200 performs as described above with respect to the transmission 10 to achieve the launch mode, forward drive mode, reverse drive mode and regenerative braking.

Third Embodiment

FIG. 4 is another embodiment of an electromechanical transmission 300 within the scope of the invention. The transmission 300 has a transverse design, utilizing a transfer shaft with transfer gears, including a reduction gear, to provide a reduction ratio in a second mechanical power path. Thus, the third lever 40 of FIG. 1 is replaced by the transfer axis and transfer gears as described below.

The transmission 300 is designed to receive at least a portion of its driving power from the engine 11. The engine 11 has an output shaft that serves as an input member 12 of the transmission 300. An output member 14 of the transmission 300 connects to a final drive unit (not shown) to deliver driving power to the wheels of a vehicle. The transmission 300 includes two simple planetary gear sets. A first planetary gear set 320 includes a sun gear member 322 (designated S1), a ring gear member 324 (designated R1) and a carrier member 327 that rotatably supports a plurality of pinion gears 329 (designated P1) in meshing engagement with both the sun gear member 322 and the ring gear member 324.

The transmission 300 also includes a second planetary gear set 330 that includes a sun gear member 332 (designated S2), a ring gear member 334 (designated R2) and a carrier member 337 that supports a plurality of pinion gears 339 (designated P2) in meshing engagement with both the ring gear member 334 and the sun gear member 332.

The transmission 300 further includes a transfer shaft 380 having a reduction transfer gear 382 connected for common rotation thereto. The reduction transfer gear 382 intermeshes with the carrier member 337 for common rotation therewith. The carrier member 337 is formed with teeth on an outer circumference thereof that intermesh with the toothed reduction transfer gear 382. Alternatively, an additional gear with external teeth that is coaxial with the carrier member 337 may be mounted to the end of the carrier member 337 such that the additional gear intermeshes with the reduction transfer gear 382. A second transfer gear 384 is also connected for common rotation to the transfer shaft 380. The second transfer gear 384 intermeshes with the ring gear member 324, which is formed with teeth on an outer circumference thereof. Alternatively, an additional gear coaxial with ring gear member 324 may be mounted adjacent to ring gear member 324, in which case the additional gear may intermesh with the second transfer gear 384. A final drive gear set 386 includes gear 388 that is connected for common rotation with transfer shaft 380. The final drive gear set 386 further includes gear 389, which intermeshes with gear 388 and is connected for common rotation with the output member 14.

The input member 12 is continuously connected with the carrier member 327. An interconnecting member 352 continuously interconnects carrier member 327 with ring gear member 334. The output member 14 is operatively connected with the ring gear member 324 through the transfer gear 384, the transfer shaft 380 and the final drive gear set 386.

A first motor generator 360 (designated MG1) is continuously connected with the sun gear member 322. A second motor/generator 362 (designated MG2) is continuously connected with the sun gear member 332. A battery 364 selectively supplies power to or receives power from MG1 360 and/or MG2 362 under the control of controller 366. Other electric storage devices that have the ability to store electric power and dispense electric power may be used in place of the battery 364 without altering the concepts of the present invention. The battery 364 will be sized depending on regenerative requirements, regional issues such as grade and temperature, and other requirements such as emissions, power assist and electric range.

The controller 366 is in signal communication with the battery 364 communicates and with MG1 360 and MG2 362. Additionally, the controller 366 communicates with other vehicle electrical components (not shown), such as electrical power steering, and electrical power braking systems, etc.

The controller 366 responds to a variety of input signals including vehicle speed, operator demand, the level to which the battery 364 is charged and the power being applied by the engine 11, to regulate the flow of power between the battery 364 and the motor/generators, MG1 360 and MG2 362. The controller 366 can manipulate each of the motor/generators 360 and 362 to act as either a motor or a generator, by applying the appropriate voltage and current via power inverters 368, 369, respectively. The inverters 368, 369 regulate the flow of power between the battery 364 and the motor/generators MG1 360, MG2 362, to convert between direct current power utilized by the battery 364 and alternating current power utilized by and/or generated by the motor/generators MG1 360, MG2 362. The use of power inverters is readily understood by those skilled in the art.

The relationship between the stick diagram transmission 300 and the lever diagram of FIG. 1 is as follows: the planetary gear set 320 corresponds with lever 20 and the planetary gear set 330 corresponds with lever 30 and the transfer gears 382, 384 correspond with the third lever 40, as described below. Specifically, carrier member 327 is node A, ring gear member 324 is node B, and sun gear member 322 is node C. Ring gear member 334 is node D, carrier member 337 is node E and sun gear member 332 is node F. Those skilled in the art will recognize that the intermeshing of externally-toothed carrier member 337 and reduction transfer gear 382 is represented by lever 40, with reduction transfer gear 382 representing node G. The reduction ratio of lever 40 is instead realized through the intermeshing carrier member 337 and reduction transfer gear 382. Transfer gear 384 is node H. The fact that the intermeshing gears (carrier member 337 and reduction transfer gear 382, or ring gear member 324 and transfer gear 384) are mounted on parallel axes of rotation is represented by grounded node I. The transfer gear meshes 324 to 384 and 388 to 389 together implement a final drive reduction with the output member 14 rotating in the same direction as the ring gear member 324. The second transfer gear meshes 337 to 382 and 388 to 389 together implement a final drive reduction with the output member 14 rotating in the same direction as the carrier member 337. Since the relationship: (number of teeth on gear 382)/(number of teeth on carrier 337)>(number of teeth on gear 332)/(number of teeth on ring 384) holds, the reduction ratio from carrier 337 to output member 14 will be greater than the reduction ratio from ring 324 to output member 14. Those skilled in the art will recognize that the ratio: ((number of teeth on gear 382)/(number of teeth on carrier 337))/(number of teeth on gear 384)/(number of teeth on ring 324)) equals the ratio of the reduction gear described by lever 40. Those skilled in the art will also recognize that the ratio: (number of teeth on gear 384)/(number of teeth on ring 324)*(number of teeth on gear 389)/(number of teeth on gear 388) equals the final drive ratio.

The first mechanical path includes the carrier member 327, the ring gear member 324, transfer gear 384, transfer shaft 380 and final drive gear set 386. The second mechanical path includes the carrier member 327, interconnecting member 352, the ring gear member 334, the carrier member 337, reduction transfer gear 382, transfer shaft 380 and the final drive gear set 386. The reduction ratio achieved in the second mechanical path (i.e., the ratio of speed input at the carrier member 337 to the speed output at the transfer shaft 380) is dependent on the tooth count of the externally-toothed carrier member 337 and the reduction transfer gear 382. The transmission 300 performs as described above with respect to the transmission 10 to achieve the launch mode, forward drive mode, reverse drive mode and regenerative braking.

Figure 5:
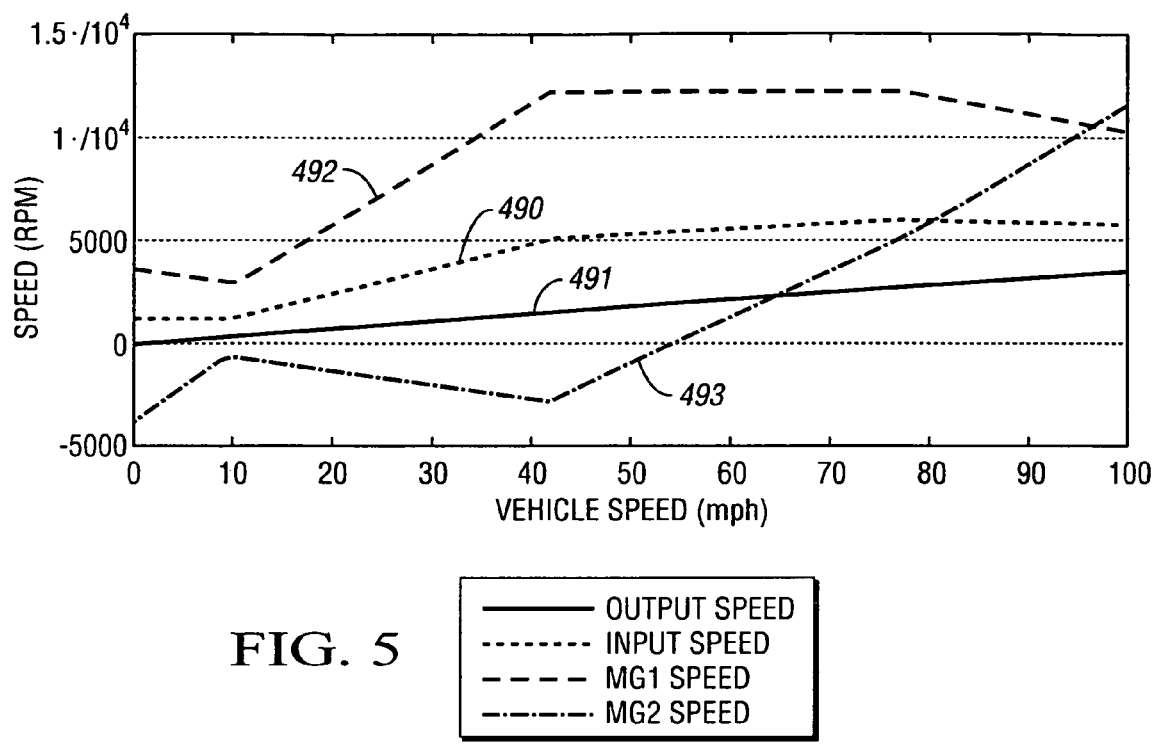
FIG. 5 is a chart showing speed of various components of a transmission within the scope of the invention versus vehicle speed during wide open throttle acceleration.
Figure 6:
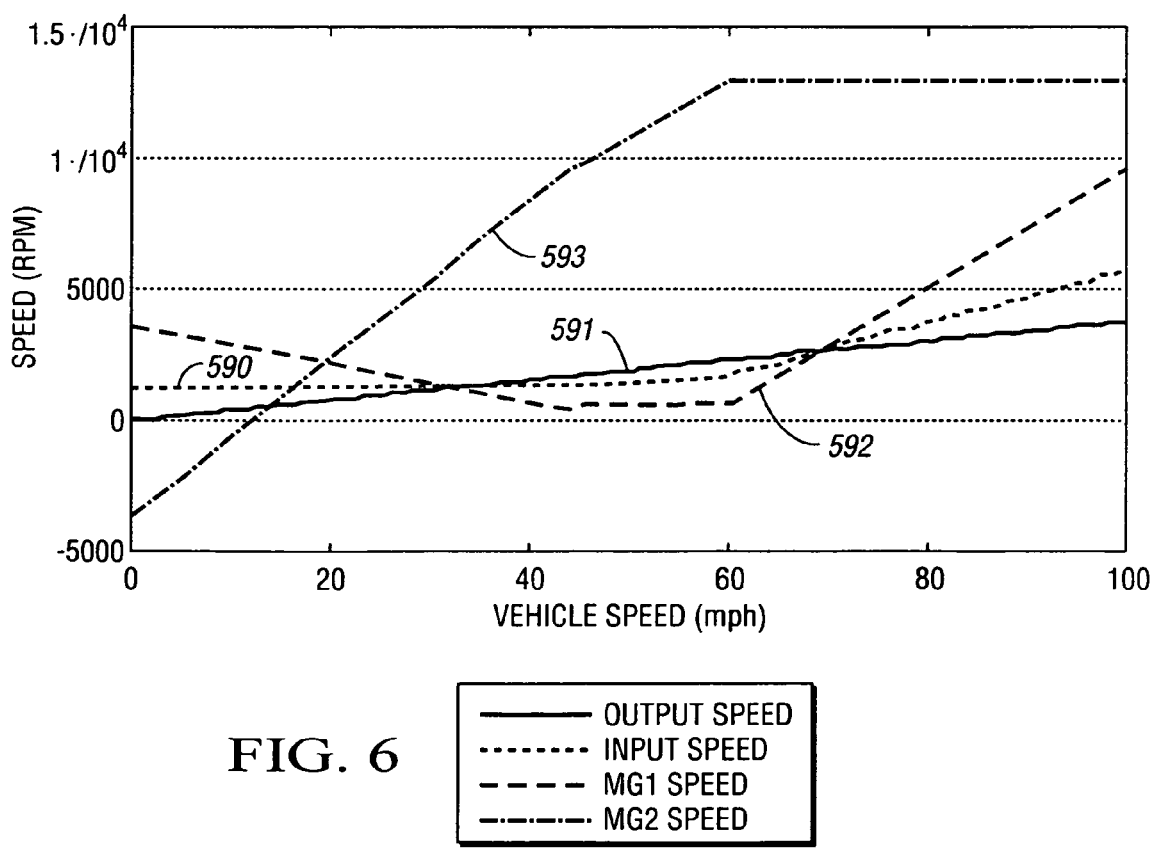
FIG. 6 is a chart showing the speeds of the components of FIG. 5 versus vehicle speed during constant cruise.
Figure 7:
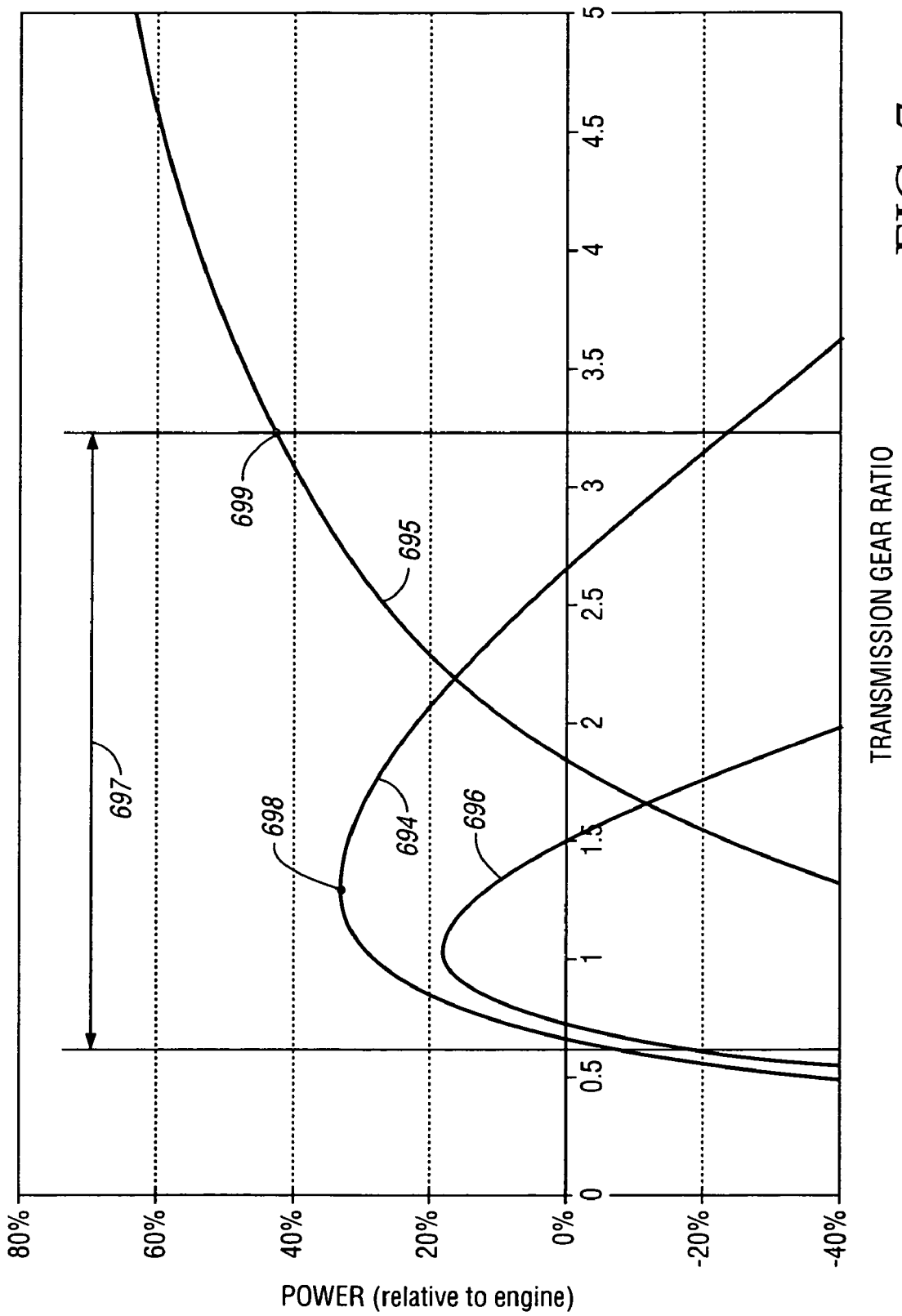
FIG. 7 is a chart depicting electrical power requirements of a transmission within the scope of the invention relative to electrical power requirements of other types of electromechanical transmissions.

For FIG. 4, example tooth ratios are: R1/S1=3; R2/S2=3; transfer gear 384/R1=1, transfer gear 382/carrier member 337=2, final drive gear set 386=3. Assuming these ratios, FIG. 5 shows motor and engine speeds during wide open throttle acceleration and FIG. 6 shows motor and engine speeds during constant speed cruise. FIG. 7 shows the electrical path power of the transmission 300 with these gear ratios as compared to a two mode transmission with like ratios.

Specifically, the plot of FIG. 5 shows input speed 490 (speed of input member 12), output speed 491 (speed of output member 14), MG1 speed 492 (speed of MG1 360) and MG2 speed 493 (speed of MG2 362) during wide open throttle acceleration versus vehicle speed.

The plot of FIG. 6 shows input speed 590 (speed of input member 12), output speed 591 (speed of output member 14), MG1 speed 592 (speed of MG1 360) and MG2 speed 593 (speed of MG2 362) during constant cruise versus vehicle speed.

The plot of FIG. 7 shows the electrical path power relative to engine power (i.e., the power provided by the motor/generators MG1 360 and MG2 362 as a percentage of the power provided by the engine 11 for a range of transmission gear ratios, when operating with zero battery power. A transmission gear ratio is the ratio of the speed of the input member 12 to the speed of the output member 14. The relative electrical path power of the single mode, wide ratio, compound-split transmission 300 is represented at curve 694. The relative electric path power of a typical two mode, input-split, compound-split electrically variable transmission is indicated at curves 695 and 696. Curve 695 represents the first mode (in which power flow is in an input-split arrangement) and curve 696 represents the second mode (in which power flow is in a compound-split arrangement). Thus, assuming a desired ratio coverage indicated by the vertical boundaries on line 697 (a ratio coverage of 5.4), the typical dual mode transmission requires that the electrical path power must be 42% of engine power (see point 699). The single mode, wide ratio, compound-split transmission 300 requires that the electrical path power must be 33% of engine power (see point 698). Accordingly, FIG. 7 illustrates that the transmission 300 (or any single mode, wide ratio compound-split transmission within the scope of the invention) allows a reduction in motor power requirements, and associated reductions in motor size and battery voltage requirements.

While the best modes for carrying out the invention have been described in detail, those familiar with the art to which this invention relates will recognize various alternative designs and embodiments for practicing the invention within the scope of the appended claims.

The invention claimed is:

1. An electromechanical transmission comprising:
   an input member;
   an output member;
   first and second motor/generators;
   first and second differential gear sets each having a first, a second and a third member and being represent able by a first and a second lever of a lever diagram, respectively, each of said levers having a first, a second and a third node corresponding with said first, second and third members;
   a reduction gear operatively connected with said output member and configured to provide a reduction in speed ratio;
   wherein said first node of said first lever is operatively connected with said input member and is continuously connected with said first node of said second lever for common rotation therewith;
   wherein said second node of said first lever is operatively connected with said output member without connection through either of said second lever and said reduction gear;
   wherein said second node of said second lever is continuously connected with said reduction gear for common rotation therewith; and
   wherein said third node of said first lever is continuously connected with said first motor/generator and said third node of said second lever is continuously connected with said second motor/generator; wherein the transmission is characterized by an absence of selectively engagable torque-transmitting mechanisms for establishing first and second mechanical power paths between said input member and said output member; the transmission thereby being characterized as a single mode, compound-split electrically variable transmission with said two mechanical power paths between said input member and said output member, said reduction ratio active in only one of said mechanical power paths.

2. The electromechanical transmission of claim 1, wherein said first mechanical path includes said first and second nodes of said first lever, and does not include said second lever or said reduction member; and wherein said second mechanical path includes said first node of said first lever, said first and second nodes of said second lever, and said reduction gear.

3. The electromechanical transmission of claim 1, further comprising:
   a brake selectively engagable to ground said input member to a stationary member, thereby providing reaction torque for said first motor/generator.

4. The electromechanical transmission of claim 1, wherein said reduction gear is a first member of a third differential gear set also having a second member and a third member and represent able by a third lever having respective first, second and third nodes; wherein said output member and said second node of said first lever are continuously connected with said second node of said third lever; and wherein said third node of said third lever is non-selectively grounded to a stationary member.

5. The electromechanical transmission of claim 1, further comprising:
   a transfer shaft; wherein said reduction gear is connected for common rotation with said transfer shaft; and
   a second transfer gear connected for common rotation with said transfer shaft and intermeshing with said second member of said second differential gear set.

6. The electromechanical transmission of claim 1, wherein an electric launch mode is provided by said second motor/generator acting as a motor through said second differential gear set and said reduction gear.

7. The electromechanical transmission of claim 6, further comprising:
   a brake selectively engagable to ground said input member to a stationary member, thereby providing reaction torque for said first motor/generator; wherein said first motor/generator acts as a motor to provide driving torque to assist said second motor/generator with said electric launch mode when said brake is engaged.

8. The electromechanical transmission of claim 1, wherein regenerative braking is provided by said second motor/generator acting as a generator to slow speed of said output member through said second differential gear set and said reduction gear.

9. The electromechanical transmission of claim 8, further comprising:
a brake selectively engagable to ground said input member to a stationary member, thereby providing reaction torque for said first motor/generator; wherein said first motor/generator acts as a generator to assist said second motor/generator with regenerative braking when said brake is engaged.

10. The electromechanical transmission of claim 1, wherein said second motor/generator acts as a motor to provide a reverse mode.

11. The electromechanical transmission of claim 10, further comprising:
a brake selectively engagable to ground said input member to a stationary member, thereby providing reaction torque for said first motor/generator; wherein said first motor/generator acts as a motor to assist said second motor/generator with providing said reverse mode when said brake is engaged.

12. An electromechanical transmission comprising:
an input member;
an output member;
first and second motor/generators;
first, second and third differential gear sets each having a first, a second and a third member;
a stationary member;
wherein said first member of said first differential gear set is operatively connected with said input member and is continuously connected with said first member of said second differential gear ser for common rotation therewith;
wherein said second member of said first differential gear set is continuously connected with said second member of said third differential gear set; wherein said output member is continuously connected with said second member of said third differential gear set, wherein said third member of said third differential gear set is nonselectively grounded to said stationary member, said first and second members of said first differential gear set and said second member of said third differential gear set thereby defining a first mechanical path from said input member to said output member;
wherein said second member of said second differential gear set is continuously connected with said first member of said third differential gear set for common rotation therewith, wherein said third differential gear set is configured to provide a reduction ratio reducing speed from said second member of said second differential gear set to said second member of said third differential gear set, said first member of said first differential gear set, said first and second members of said second differential gear sets, said first member of said third differential gear set thereby defining a second mechanical path between said input member and said output member; and
wherein said third member of said first differential gear set is continuously connected with said first motor/generator and said third member of said second differential gear set is continuously connected with said second motor/generator; wherein the transmission is characterized by an absence of selectively engagable torque-transmitting mechanisms for establishing said first and second mechanical power paths between said input member and said output member; the transmission thereby being characterized as a single mode, compound-split electrically variable transmission having said first and second mechanical power paths, said reduction ratio active in only one of said mechanical paths.

13. The transmission of claim 12, wherein said first, second and third differential gear sets are simple planetary gear sets, each having a sun gear member, a ring gear member and a carrier member that rotatably supports a set of pinion gears that intermesh with both the sun gear member and the ring gear member.

14. The transmission of claim 12, further comprising:
a brake selectively engagable to ground said input member to a stationary member, thereby providing reaction torque for said first motor/generator.

15. A single mode, compound-split, electromechanical transmission including two motor/generators and two planetary gear sets and having first and second mechanical power flow paths, said first mechanical power flow path being active at low speed ratios, said second mechanical power flow path being active at high speed ratios and including an available reduction gear, thereby enabling relatively low torque requirements for said second motor/generator; wherein said transmission is characterized by an absence of selectively engagable torque-transmitting mechanisms engagable to switch between said first and second mechanical power flow paths.

16. The transmission of claim 15, wherein said planetary gear sets each have a first, a second and a third member, and further comprising:
an output member, wherein said reduction gear is operatively connected with said output member and is configured to provide a reduction in speed ratio;
a transfer shaft, wherein said reduction gear is connected for common rotation with said transfer shaft; and
a second transfer gear connected for common rotation with said transfer shaft and intermeshing with said second member of said second planetary gear set.

17. The transmission of claim 15, further comprising:
an output member;
a stationary member;
wherein said reduction gear is a first member of a third planetary gear set that also has a second member and a third member;
wherein said output member and one of said members of said second planetary gear set are continuously connected for common rotation with said second member of said third planetary gear set; and wherein said third member of said third planetary gear set is non-selectively grounded to said stationary member.

* * * * *